United States Patent [19]
Meyer

[11] 3,813,934
[45] June 4, 1974

[54] VIBRATING CYLINDER FORCE TRANSDUCER

[75] Inventor: Richard C. Meyer, Simsbury, Conn.

[73] Assignee: United Aircraft Corporation, Hartford, Conn.

[22] Filed: Feb. 28, 1973

[21] Appl. No.: 337,230

[52] U.S. Cl. .............................. 73/141 R, 73/DIG. 1
[51] Int. Cl. .............................................. G01l 1/10
[58] Field of Search............ 73/DIG. 1, 141 A, 67.2, 73/398 R, 141 R

[56] References Cited
UNITED STATES PATENTS

| 2,513,678 | 7/1950 | Rieber | 73/141 A |
| 3,021,711 | 2/1962 | Arvidson | 73/398 R |
| 3,168,826 | 2/1965 | Paetow | 73/141 A |
| 3,618,360 | 11/1971 | Curtis | 73/398 R |

FOREIGN PATENTS OR APPLICATIONS

| 188,718 | 3/1967 | U.S.S.R. | 73/141 A |

*Primary Examiner*—Charles A. Ruehl
*Attorney, Agent, or Firm*—M. P. Williams

[57] ABSTRACT

A vibrating cylinder, which is electronically driven by a feedback amplifier in response to electromagnetic signals representing the vibrations thereof, is completely surrounded by vacuum and is axially loaded, in tension or compression, whereby the natural frequency thereof varies as a function of the force of axial loading. The loaded end of the cell is sealed to vacuum by a diaphragm. The loading means is connected to a diaphragm of equal area, atmospheric pressure against which loads the cell in a direction oppositely to the first diaphragm, whereby axial loading is equally independent of pressure and density effects. Thermostatic heating obviates temperature variations. A tension embodiment includes a hoop for loading the cylinder, and a compression embodiment comprises a beam-type suspended-pan scale.

4 Claims, 2 Drawing Figures

VIBRATING CYLINDER FORCE TRANSDUCER

BACKGROUND OF THE INVENTION

1. Field of Invention

This invention relates to force transducers, and more particularly to a vibrating cylinder force transducer.

2. Description of the Prior Art

There are many situations which require the use of a force transducer. Typical among these are scales which weigh masses of matter, the force being that of gravity acting on the mass. Simpler scales, which have been known to the art for decades or centuries do not lend themselves to electronic utilization of the indications thereof, but rather are capable only of manual reading of the deflection of a calibrated spring to infer the weight indicated thereby. More advanced scales may be of the fixed beam type in which the stress imposed upon a cantilevered beam by the point application of a weight or force is measured by strain gauges. However, both of these approaches are limited to analog (rather than digital) output, are subject to voltage drift, and have long term instability due to varying factors such as the creep of cements which hold the strain gauges, hysteresis effects and so forth. Other devices are of the force balance type in which torque motors or other motive devices are used to increase spring tension and thereby develop a force equal and opposite to the force being measured. These devices, which generally work around a null point of deflection, are generally quite expensive, involve much hardware, have poor speed of response characteristics, have bearing points which contribute to hysteresis, are complex and have low reliability.

SUMMARY OF INVENTION

The object of the present invention is to provide an improved force transducer.

According to the present invention, a vibrating cylinder is axially loaded by a force which is to be measured, the frequency of vibration of the cylinder wall being an indication of the force imposed thereon. In accordance further with the invention, the force applying means is connected axially to one end of the cylinder and includes a diaphragm which seals the exterior of the walls of the cylinder from ambient atmosphere, there being an additional evacuated chamber connected to the force applying means in a manner such that atmospheric effects act oppositely thereon, whereby effects of atmospheric density and pressure are eliminated and/or compensated so as to render the frequency of vibration of said cylinder independent thereof. According still further to the present invention, thermostatic heating thereof renders its operation free of any variations as a function of temperature.

According to the invention in one form, the vibrating cylinder is axially loaded through a structural hoop; according to the invention in another form, the vibrating cylinder is axially loaded by the beam of a suspended-pan scale.

The present invention provides an extremely accurate and simple force transducer having a rapid response characteristic. The force transducer in accordance with the present invention is easy to calibrate, has no hysteresis, is insensitive to power supply or temperature variations, is isolated from the pressure and density effects of atmospheric gases, vapors, and liquids, and is capable of high resolution digital readings with very good repeatability. The transducer in accordance herewith can be virtually insensitive to vibrations and acceleration forces, and has very high long term stability.

The invention is readily implemented utilizing vibrating cylinders, and driving and read out circuits therefor, which are available in the art, with all the advantages attendant thereto.

Other objects, features and advantages of the present invention will become more apparent in the light of the following detailed description of preferred embodiments thereof, as illustrated in the accompanying drawing.

DESCRIPTION OF THE PREFERRED EMBODIMENT

Figure 1:
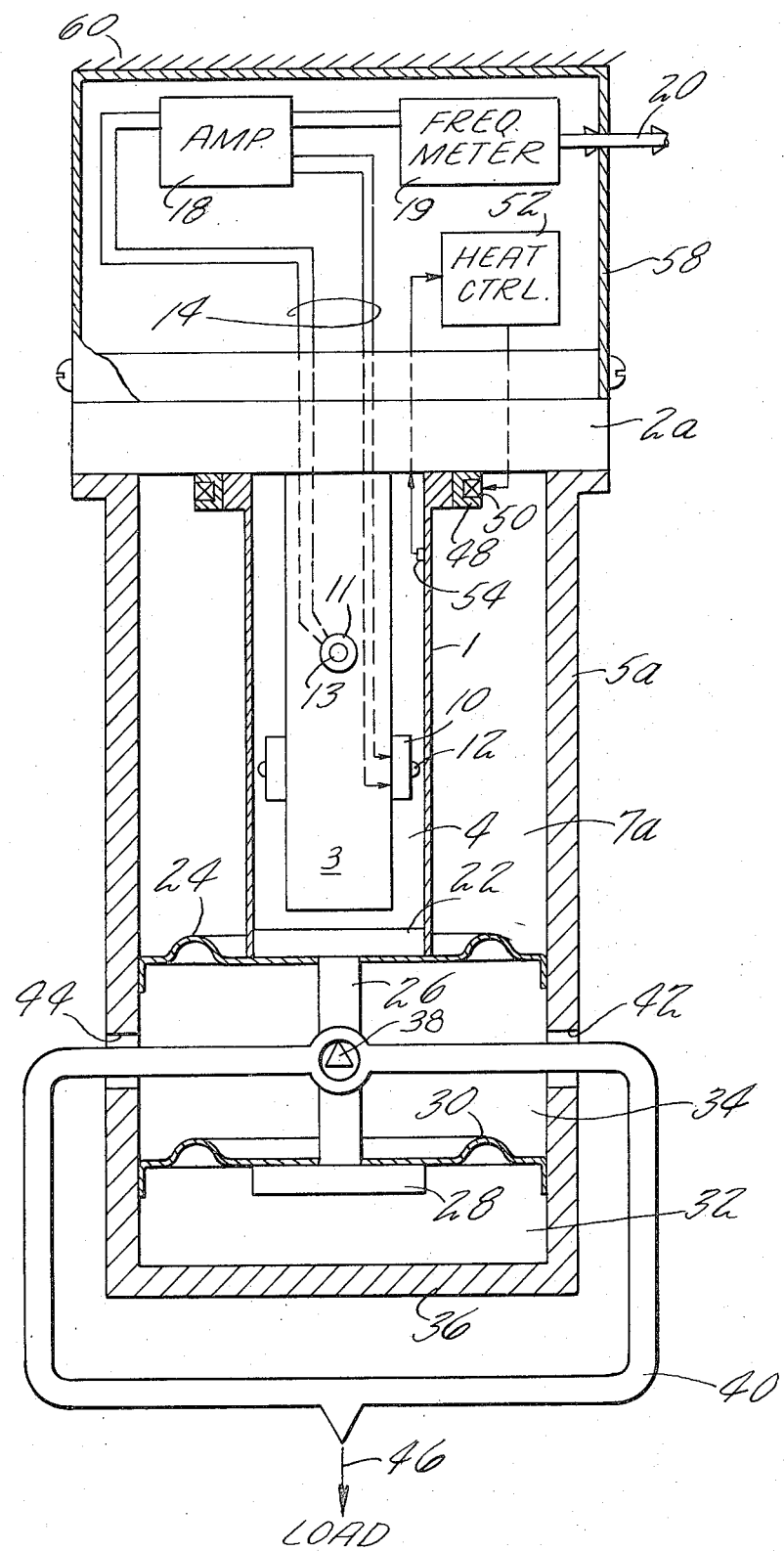
FIG. 1 is a simplified partially sectioned side elevation and block diagram of a first illustrative embodiment of the present invention.

Referring now to FIG. 1, a force transducer in accordance with the present invention includes a vibrating cylinder 1 of the type described in Arvidson U.S. Pat. No. 3,021,711, to which further reference may be made if desired with respect to the vibrating cylinder per se and its associated circuitry. Structure herein which is the same as (or not materially different from) the structure of said Arvidson patent bears the same reference numeral; similar structure which is modified in order to accommodate the present invention herein bears the same reference numeral with a small letter designation; and structure herein having no counterpart in said Arvidson patent bears reference numerals in excess of the numeral 19.

Within the vibrating cylinder 1 there is located a solid coil frame or spool body 3 within which there is disposed a driving coil 10 having a soft iron core 12 and a pickup coil 11 having a permanently magnetized core 13, with suitable electrical connections 14 causing the electrical output pickup coil 13 to feed an amplifier 18, an electrical output of which in turn is applied to the drive coil 10 which imposes an electromagnetic vibratory force excitation upon the cylinder, and another electrical output of which is applied to a frequency meter 19, from which digital outputs may be obtained on a suitable output bus 20. The vibrating cylinder 1 is sealed off at one end by a base 2a and is sealed off at the other end by a force applying plate 22 so as to form an evacuated chamber 4 inside the vibrating cylinder 1. The force plate 22 is connected by a flexible diaphragm 24 to an outer case 5a, thereby forming a second evacuated chamber 7a. The force plate 22 is connected through a force applying post 26 to a second plate 28 which in turn is connected to the outer case 5a by a flexible diaphragm 30 so as to form a third evacuated chamber 32. Atmospheric pressure forces which act in a downward direction on the second plate 28, second diaphragm 30 and third evacuated chamber 32 exactly counterbalance the atmospheric pressure forces acting in an upward direction (as seen in FIG. 1) on the force plate 22 and diaphragm 24. Naturally, the diaphragms 24 and 30 must have identical mechanical force-deflection characteristics, and the overall area exposed to the atmospheric pressure forces must be the same for the plate and diaphragm 22 and 24 as for the plate and diaphragm 28 and 30. This is an important aspect of the present invention.

Disposed on the force applying post 26 is a suitable low friction bearing support, such as a knife edge 38, which supports a structural hoop 40 that passes through clearance holes 42, 44 in the outer casing 5a, which also provide venting of atmosphere to the chamber 34. A tensile force may be applied to the structural hoop 40, as indicated by the arrow 46, which force is directly transmitted through the structural hoop 40 to the bearing 38. This force causes tension on the wall of the cylinder 1 which thereby increases its natural frequency of vibration, which in turn increases the frequency of electric signals from the pickup coil 11 and through the amplifier 18, thereby increasing the frequency of signals applied to the drive coil 10, all as is described in the aforementioned Arvidson patent. The aforementioned wall vibration is, however, independent of pressure or density of the ambient since the vibratory portion of cylinder 1 is surrounded on both sides by vacuum in the first evacuated chamber 4 and in the second evacuated chamber 7a. Similarly, as described hereinbefore, any atmospheric effect on the force applying plate 22 and diaphragm 24 are offset by identical but opposite effects on the second plate 28 and second diaphragm 30 which are transmitted to the plate 22 by the force applying post 26.

If desired, the device may be made further independent of ambient effects due to temperature by providing a heater element consisting of a spool 48 wound with nichrome or other suitable heating wire 50 which is driven, in closed loop fashion, by current from a heat control 52 in response to temperatures sensed by a thermistor 54 or other temperature transducer. The thermostatic heating of the cylinder 1 is effected in a well known fashion utilizing components and technology which are readily available in the art. Since the cylinder 1 is metallic, heat applied to the end of the cylinder will be conducted throughout the cylinder (although it may have a small temperature gradient from the heated end to the unheated end), and the temperature of the cylinder 1 can therefore be made stable, notwithstanding temperature changes outside of the outer casing 5a and the diaphragm 24. If desired, other heater coils can be added as can insulating material so as to further isolate the vibrating walls of the cylinder 1 from the temperature effects of the ambient. Although not shown in FIG. 1, the structural hoop 40 may be split so as to pass on either side of the force applying post 26 for greater stability if desired, in which case the bearing 38 would extend on the opposite side of the post 26 (as not viewable in FIG. 1).

As an alternative, the structural hoop 40, or an equivalent structure, could be rigidly fixed, and force could be applied axially to the remaining structure, such as the outer casing 5a, in a manner which should be obvious to those skilled in the art.

As illustrated briefly in FIG. 1, the electronics (18, 19, 52) may be mounted in a housing 58 contiguous with the base structure 2a, which may be fixed against the operation of the force (46) as illustrated by the hatch lines 60.

Figure 2:
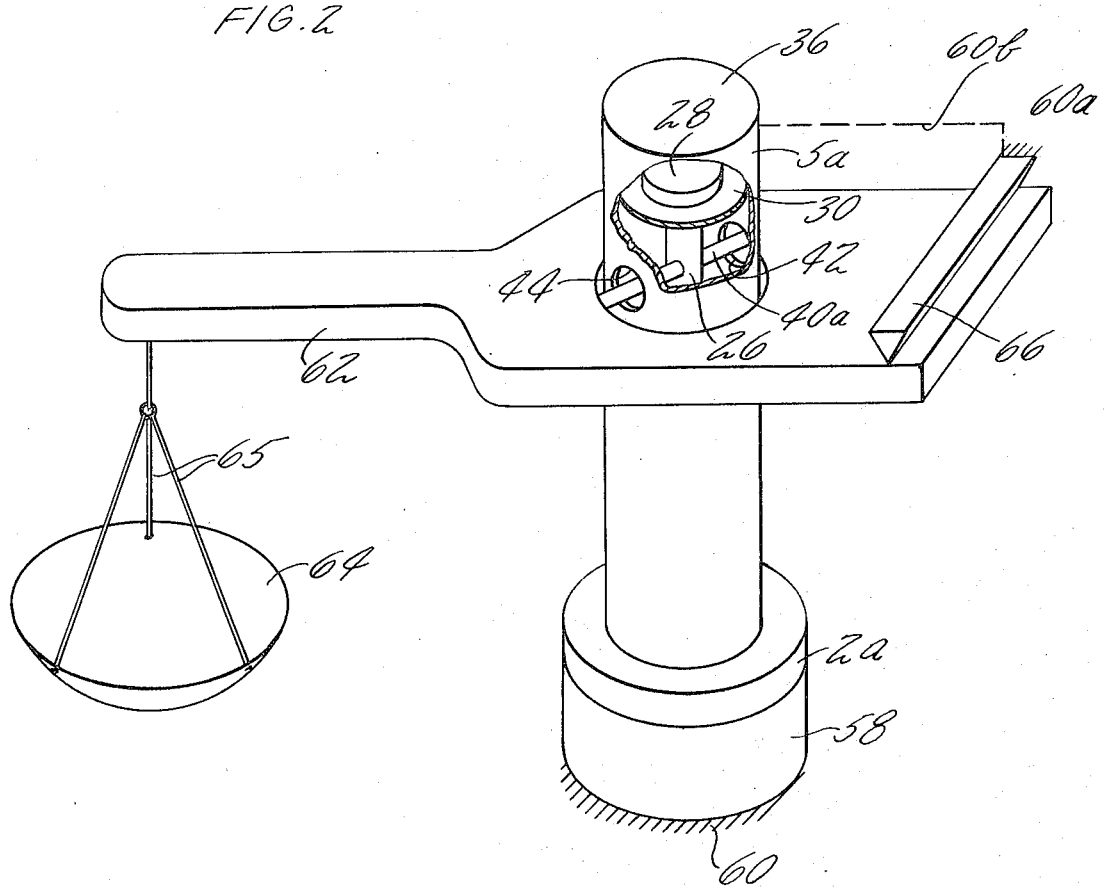
FIG. 2 is a partially broken away simplified perspective of a second embodiment of the invention.

A second embodiment of the present invention is illustrated in FIG. 2. Therein, the only difference from the structure of FIG. 1 is that a bar 40a is suitably attached to the force applying post 26 so as to transmit axial loads, rather than utilization of the structural hoop 40 of FIG. 1. The bar 40a in turn is fixedly attached to a beam 62 having a point-suspended pan 64 for the placement of masses to be weighed. The beam 62 bears against a suitable support bearing such as a knife edge 66 which is rigidly attached to the mechanically grounded portion of the device as indicated by the hatched lines 60a, and may in fact be connected directly to the outer casing 5a as indicated by the dashed line 60b. The pan 64 may be suspended in any suitable fashion from a point on the beam 62 such as by cables 65 so as to apply the force at a constant moment-arm distance from the bar 40a, regardless of the position on the pan 64 at which a weight is placed.

In the embodiment of FIG. 2, instead of tensile force, compressive force is applied by the force applying post 26 to the vibrating cylinder 1. This has the opposite effect as tensile force, that is, an increase in compressive force decreases the natural resonant frequency of vibration of the cylinder 1 (not shown in FIG. 2).

Of course, there are enumerable other ways in which the force may be brought from outside of the apparatus and applied to the cylinder in addition to the two embodiments shown in FIGS. 1 and 2 herein. Similarly, although the invention has been shown and described with respect to illustrative embodiments thereof, it should be understood by those skilled in the art that the foregoing and various other changes and omissions in the form and detail thereof may be made therein without departing from the spirit and the scope of the invention.

Having thus described typical embodiments of my invention, that which I claim as new and desire to secure by Letters Patent of the United States is:

1. A force transducer comprising:
   a vibrating cylinder including electromagnetic drive means for causing the cylindrical wall of said vibrating cylinder to vibrate, pick up means for sensing the vibrations of the wall of said cylinder, means responsive to said pick up means for driving said electromagnetic drive means and for providing signals indicative of the frequency of vibration of said cylinder, one end of said vibrating cylinder being fixedly attached to a base thereby to form a vacuum tight chamber inside of said vibrating cylinder;
   a force applying plate closing off the other end of said vibrating cylinder;
   an outer casing, a first end of said outer casing being connected in vacuum tight relationship with said base structure, a second end of said outer casing being closed off in a vacuum tight manner;
   a diaphragm interconnecting said force applying plate with said outer casing, thereby to form a vacuum tight chamber between said vibrating cylinder and said outer casing;
   a second plate;
   a second diaphragm interconnecting said second plate with said casing so as to close off said second end of said casing so as to form a vacuum tight chamber within said second end of said casing;
   and force applying means interconnected between said two plates.

2. A force transducer according to claim 1 wherein said outer casing has at least one aperture therein disposed between said two plates and further comprising:

force transmitting means connected to said force applying means and passing through at least one aperture in said outer casing for applying a force external of said outer casing to said force applying means.

3. A force transducer according to claim 2 wherein said force transmitting means includes a bearing disposed on said force applying means and a hoop extending through oppositely disposed apertures in said outer casing engaging said bearing, said hoop adapted to have a load applied thereto in a direction substantially aligned with said force applying means, whereby said load is transferred through said hoop and said bearing to said force applying means, thereby to load said cylinder and vary the natural frequency of vibration thereof.

4. A force transducer according to claim 3 wherein said force transmitting means comprises a member extending through a pair of apertures in said outer casing and pivotably disposed to said force applying means, opposite ends of said member being rigidly attached to structure adapted to receive masses the weight of which is to be measured by said transducer, whereby the force of said weight is transmitted through said member to said force applying means to load said cylinder and vary the natural frequency of vibration thereof.

* * * * *